United States Patent [19]

Kadoya et al.

[11] Patent Number: 4,841,296

[45] Date of Patent: Jun. 20, 1989

[54] TWO-WIRE TRANSMITTER

[75] Inventors: Norio Kadoya; Jun Kawachi, both of Yokohama; Keiji Miyazawa, Kamakura, all of Japan

[73] Assignee: Yamatake-Honeywell Co. Ltd., Tokyo, Japan

[21] Appl. No.: 3,896

[22] Filed: Jan. 16, 1987

[30] Foreign Application Priority Data

Jan. 31, 1986 [JP] Japan .................................. 61-19591

[51] Int. Cl.$^4$ .............................................. G08B 21/00
[52] U.S. Cl. ........................... 340/870.16; 340/870.21; 340/870.39; 340/310 R
[58] Field of Search ....................... 340/870.39, 870.40, 340/870.21, 310 R, 310 A, 870.16; 364/571, 172, 565; 307/126, 130, 141.4

[56] References Cited

U.S. PATENT DOCUMENTS

| | | | |
|---|---|---|---|
| 4,238,965 | 12/1980 | Mate | 73/861.48 |
| 4,240,067 | 12/1980 | Forme | 340/870.39 |
| 4,520,488 | 5/1985 | Houvia et al. | 340/310 R |
| 4,549,180 | 10/1985 | Masuda | 340/870.39 |
| 4,598,381 | 7/1986 | Cucci | 364/571 |
| 4,604,566 | 8/1986 | Sterling, Jr. et al. | 340/870.39 |

Primary Examiner—John W. Caldwell, Sr.
Assistant Examiner—Tyrone Queen
Attorney, Agent, or Firm—Mitchell J. Halista; Albin Medved

[57] ABSTRACT

A two-wire transmitter having a detecting section for detecting a physical variable to be measured to produce a detection output, first and second constant voltage devices connected in series with a two-wire transmission path, a signal processor driven by a voltage supplied by the first constant voltage device for converting the detection output into representative serial pulse signals and a switching circuit which is connected in parallel with the second constant voltage device and is turned on and off by the serial pulse signals to produce corresponding output signals from the transmitter on the two-wire transmission path by utilizing a current flowing in the two-wire transmission path while enabling the transmitter to connect in a single loop with another two-wire transmitter.

8 Claims, 2 Drawing Sheets

FIG. 1
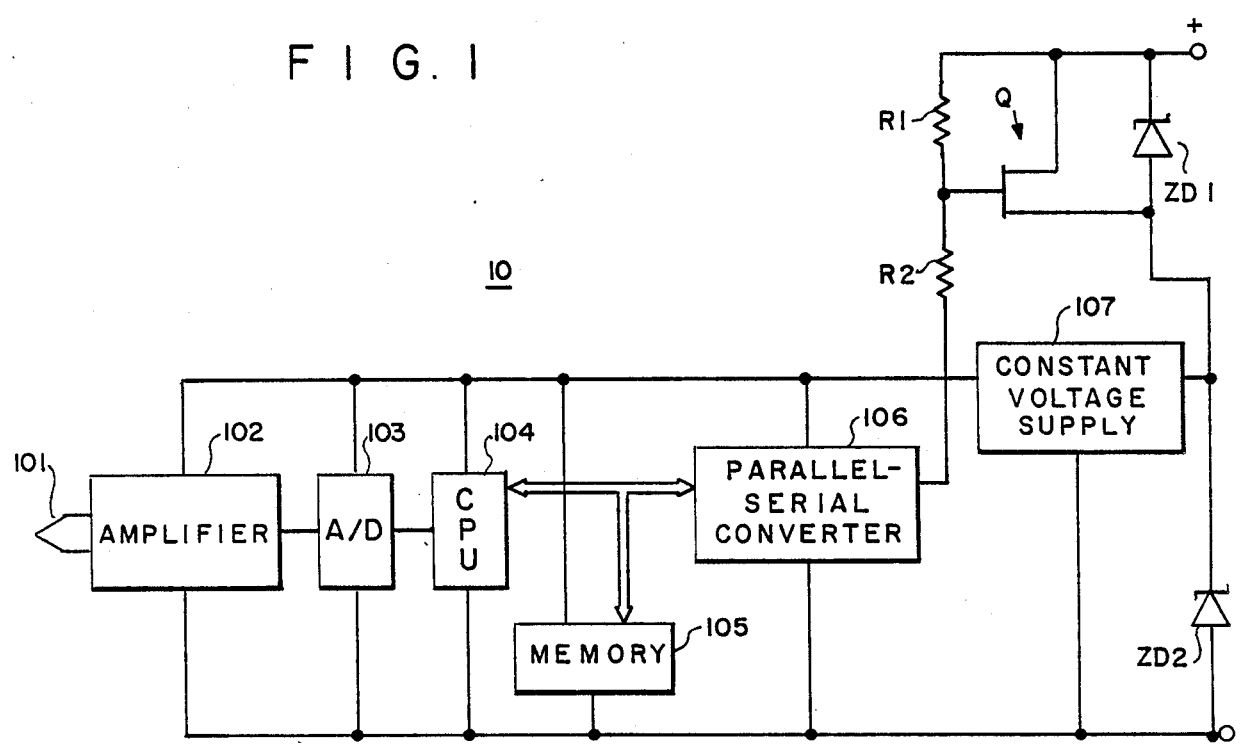
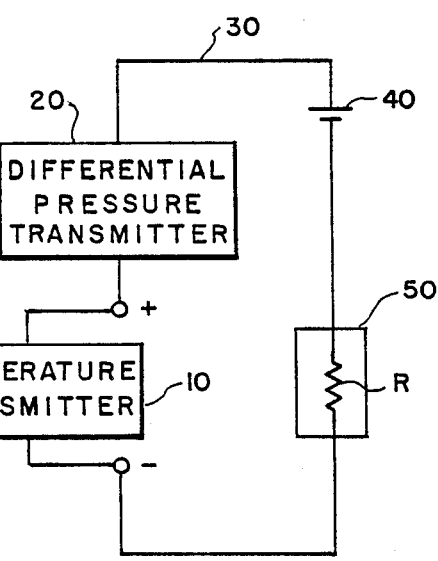
FIG. 2
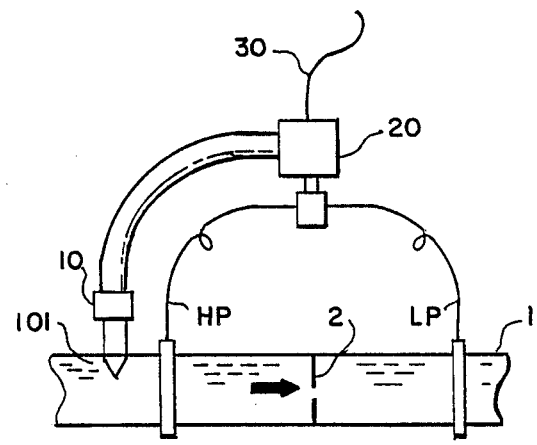
FIG. 3

TWO-WIRE TRANSMITTER

BACKGROUND OF THE INVENTION

1. Field of the Invention

The present invention relates to two-wire transmitters. More specifically, the present invention is directed to a two-wire transmitter used for detecting process variables and transmitted signals representative of the detected variable onto a two-wire transmission line.

2. Description of the Prior Art

Conventionally when a process variable, e.g., a flow rate in a process control system is to be measured from a differential pressure across an orifice, compensation of the detected pressure signals must be performed in order to obtain correct data by considering the influence thereon by temperature and static pressure. Therefore, different loops are provided for differential pressure, static pressure, and temperature transmitters, and signals from the respective transmitters are sequentially supplied to and processed by an arithmetic operation unit. With such a conventional arrangement, different transmitters and associated loops are required for different compensations, resulting in a considerably expensive system. Accordingly, it would be desirable to provide a single loop two-wire transmitter capable of effecting static pressure and temperature compensation.

SUMMARY OF THE INVENTION

An object of the present invention is to provide an improved two-wire transmitter.

In accomplishing these and other objects, there has been provided, in accordance with the present invention, a two-wire transmitter having a detecting section for detecting a physical variable to be measured to produce a detection output, first and second constant voltage device means connected in series with a two-wire transmission path, means driven by a voltage supplied by the first constant voltage device means for converting the detection output into representative serial pulse signals and a switching means connected in parallel with the second constant voltage device means and turned on and off by the serial pulse signals for transmitting the serial pulse signals on said two-wire transmission path utilizing a current flowing in said two-wire transmission path.

BRIEF DESCRIPTION OF THE DRAWINGS

A better understanding of the present invention may be had when the following detailed description is read in connection with the accompanying drawings, in which:

FIG. 1 is a block diagram of a two-wire transmitter embodying an example of the present invention, FIG. 2 is a circuit diagram showing a loop configuration using the two-wire transmitter, FIG. 3 is a pictorial illustration showing a portion of the loop shown in FIG. 2.

DESCRIPTION OF THE PREFERRED EMBODIMENT

Figure 4:
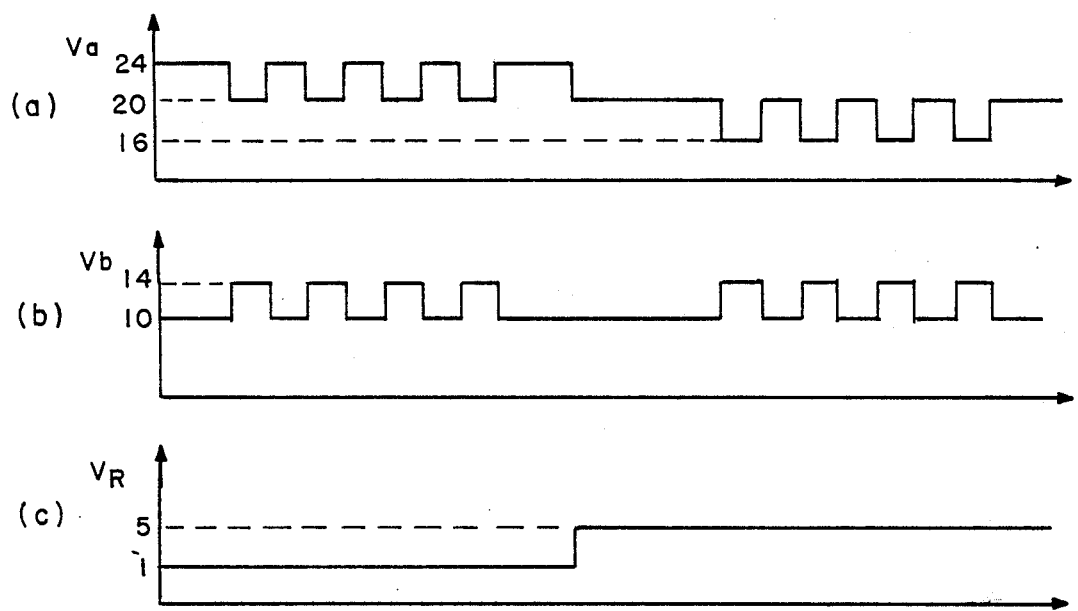
FIG. 4 shows timing charts for explaining the operation of the two-wire transmitter of the present invention.

FIG. 1 is a block diagram of an embodiment of an example of the present invention applied to a temperature transmitter, and FIG. 2 is a circuit diagram showing a loop configuration wherein a temperature transmitter is used as an auxiliary transmitter and is connected to a two-wire transmission path which is also used by a differential pressure transmitter. Referring to FIG. 2, there is shown a differential pressure transmitter 20 driven by a power source 40 for detecting a pressure difference (a high pressure-side pressure HP and a low pressure-side pressure LP) across an orifice 2 inserted in a fluid flow path 1 for a fluid, as shown in FIG. 3. The transmitter 20 supplies the detected pressure difference as a current signal of 4 to 20 mA onto a two-wire transmission path 30. This signal is received by a receiver 50 including a resistor R having a suitable resistance, e.g., 250Ω. The flow rate is obtained from the value of the signal received by the receiver 50.

It must be noted that, as described above, temperature and static pressure compensations must be performed in order to obtain correct differential pressure data. Generally, a differential pressure transmitter has both temperature and static pressure sensor functions and can compensate for a variation in differential pressure caused by temperatures and static pressures. However, the temperature sensor in the differential pressure transmitter serves to perform temperature compensation in the differential pressure transmitter, and does not perform temperature compensation of a fluid. In order to perform compensation, a temperature transmitter 10, including a detector comprising a thermocouple, is provided for detecting a fluid temperature. Static pressure compensation is performed to compensate for the influence on the differential pressure sensor section caused by the static pressure, and not to compensate for the influence on the fluid caused by the static pressure. However, since a signal from the static pressure sensor can be utilized as a static pressure signal, a static pressure transmitter need not always be provided.

With the above arrangement, the temperature transmitter 10 transmits a temperature signal to the differential pressure transmitter 20. However, since the temperature transmitter 10 does not have a signal reception function, i.e., it does not generate a signal in response to a request from the differential pressure transmitter 20. Rather, the differential pressure transmitter 20 samples a signal constantly transmitted by the temperature transmitter 10 at a constant sampling period, e.g., every twenty sec. When the differential pressure transmitter 20 receives a temperature signal, it performs a correction calculation in a data processor unit, such as a microprocessor, and transmits a correct flow rate signal.

Referring to FIG. 1, there is shown a temperature transmitter 10 wherein the temperature signal detected by a detector 101 is amplified by an amplifier 102, converted by an A/D converter 103 into a digital signal, and supplied to a digital data processor unit (CPU) 104. The processor unit 104 processes the data supplied as the digital signal in accordance with a program prestored in a memory 105 and transmits the processed result. The processor unit 104 also controls the entire circuit by suitable timing signals.

The data transmitted from the processor unit 104, which comprises parallel pulse signals, is converted into serial pulse signals by a parallel/serial converter 106.

The serial pulse signals are applied to turn on/off a transistor Q, connected in parallel with a first constant voltage device, e.g., zener diode ZD1, through a voltage divider comprising a pair of series resistors R1 and R2. The first zener diode ZD1 is connected in series with the two-wire transmission path 30. A second constant voltage device, e.g., zener diode ZD2 connected in series with the first zener diode ZD1 and, consequently, in series with the two-wire transmission path 30 serves as a circuit driving power source and supplies a constant voltage to the respective circuit components through a constant voltage supplying circuit 107. The constant voltage supplying circuit 107 serves to stabilize the voltage supplied from the zener diode ZD2 and can be omitted.

Voltage changes across the temperature transmitter 10, the differential pressure transmitter 20, and the two ends of a receiver resistor R are illustrated in the timing charts of FIG. 4. Specifically, FIGS. 4(a), 4(b) and 4(c) indicate voltages Va, Vb and VR of the differential pressure transmitter 20, the temperature transmitter 10 and the receiver resistor R, respectively. In each timing chart, the left half of the chart shows a state wherein the differential pressure transmitter 20 performs transmission with a 20% output, i.e., 4 mA, and the right half shows a state wherein the differential pressure transmitter 20 performs transmission with a 100% output, i.e., 20 mA. It can be seen from FIG. 4 that, when the temperature transmitter 10 does not transmit a signal and the transistor Q1 is ON, the voltages of the differential pressure transmitter 20, the zener diode ZD1 of the temperature transmitter 10 and the receiver resistor R are 24V, 10V and 1V, respectively, and the voltage of a power source 40 is thus 35V.

When the transmitter Q of the temperature transmitter 10 is turned OFF, and a current flows in the zener diode ZD2, the voltage drop, e.g., 4V, in this embodiment, is applied to the differential pressure transmitter 20. In this case, since the power source voltage is constant and the differential pressure transmitter 20 performs transmission with a constant output of 4 mA, the voltage change of 4V is transmitted to the differential pressure transmitter 20. The differential pressure transmitter 20 receives the voltage pulse signal, as described above, and uses it as a correction signal for internal arithmetic operation. Although the temperature detector 101 as shown comprises a thermocouple, it can comprise a temperature-measuring resistor or other temperature detecting means.

Figure 5:
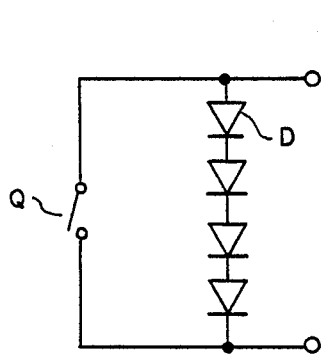
FIGS. 5 and 6 are schematics showing alternate arrangements of a second constant voltage supplying means.
Figure 6:
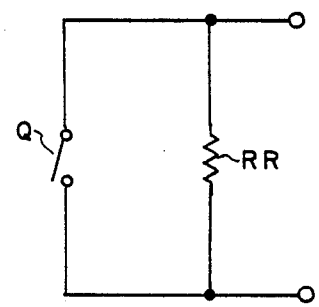

Since the circuit operation is a constant current operation, a diode D, as shown in FIG. 5, or a resistor RR, as shown in FIG. 6, can be used in place of the zener diode ZD2. When a diode is used, since it generally outputs a voltage of about 0.7V, a plurality of diodes are connected in series with each other and used. When a resistor is used, if the resistor has a resistance of, 250Ω, only a signal of 1V can be derived upon transmission with an output of 4 mA. On the other hand, when the resistor has a resistance of 1 kΩ, a voltage drop upon transmission with an output of 20 mA becomes as high as 20V, thus requiring a high power source voltage. Therefore, a resistor must be suitably selected.

Figure 7:
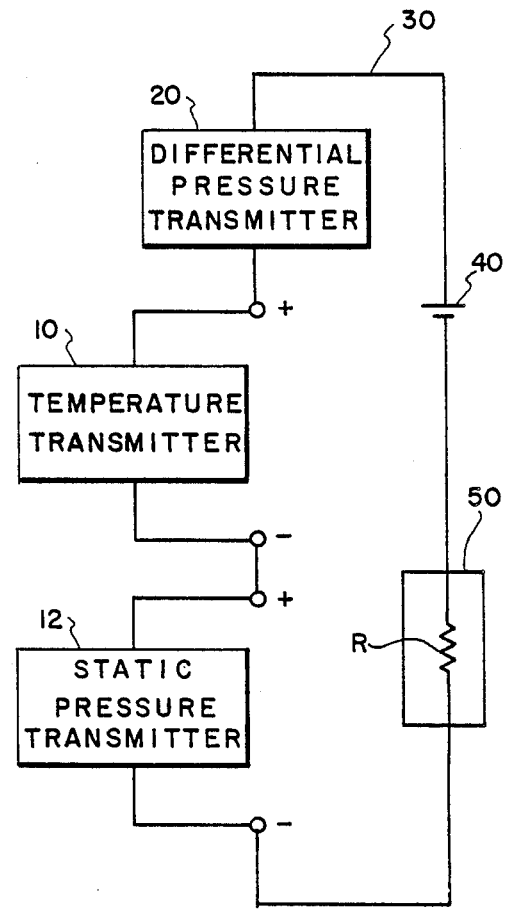
FIG. 7 is a circuit diagram of an alternate loop configuration.

In the above description, only the temperature transmitter 10 is used as the auxiliary transmitter. However, temperature and static pressure transmitters 10 and 12 can be connected as the auxiliary transmitter, as shown in FIG. 7. In this embodiment, both the temperature and static pressure transmitters 10 and 12 can have the same arrangement as in FIG. 1 (note that a detector of the static pressure transmitter 12 comprises a pressure sensor). In this case, the temperature transmitter 10 transmits a pulse signal in the same manner as described above, and similarly the static pressure transmitter 12 transmits a pulse signal representing a static pressure. Both of these signals are received by the differential pressure transmitter 20, and the differential pressure transmitter 20 transmits an output whose variation due to a change in temperature or static pressure is compensated.

In this case, however, when both the temperature and static pressure transmitters 10 and 12 transmit signals simultaneously, signal collision can occur on the loop. In order to prevent this, it is preferable that the temperature and static pressure transmitters 10 and 12 are synchronized and controlled so as not to perform transmission simultaneously, or a signal reception function is imparted to each auxiliary transmitter and performs transmission in response to a request from the differential pressure transmitter as the main transmitter.

With a similar arrangement, when there are three or more elements which influence the physical variable to be measured, e.g., the differential pressure in this embodiment, of the main transmitter, and for which compensation must be performed, three or more auxiliary transmitters can be connected to the same loop as that for the main transmitter, and compensation can thus be performed. In the system described above, the differential pressure transmitter is used as the main transmitter. However, the present invention is not limited to this, and can be applied to any system which transmits an electrical signal representing an arbitrary physical amount.

As described above, a two-wire transmitter according to the present invention has a detecting section for detecting a physical amount to be measured, first and second constant voltage device means connected in series with a two-wire transmission path, a means for producing serial pulse signals in accordance with a detection output from the detecting section, and a switching means which is connected in parallel with the second constant voltage device means and is turned on/off by the serial pulse signals. Therefore, a signal required for compensation can be transmitted to a main transmitter connected on the same loop. Therefore, although a plurality of loops are conventionally needed, only one loop is needed, or a new loop can be added to an existing loop, thus leading to a cost reduction.

Accordingly, it can be seen that there has been provided, in accordance with the present invention, an improved two-wire transmitter.

The embodiments of the present invention in which an exclusive property or privilege is claimed are defined as follows:

1. A two-wire transmitter comprising
   a detecting section for detecting a physical variable to be measured to produce a detection output,
   first constant voltage device means connected in series with a two-wire transmission path,
   signal processing means energized by a voltage supplied by said first constant voltage device means for converting the detection output into representative serial pulse signals,
   second constant voltage device means connected in series with said two-wire transmission path, and
   switching means connected in parallel with said second constant voltage device means and turned on/off by the serial pulse signals for transmitting the serial pulse signals on said two-wire transmission path utilizing a current flowing in said two-wire transmission path.

2. A transmitter as set forth in claim 1 wherein said signal processing means includes a digital computer and an analog-to-digital converter for supplying digital representations of said detecting section output to said digital computer.

3. A transmitter as set forth in claim 1 wherein said switching means includes a transistor having an emitter-collector path connected in parallel with said second voltage supplying means and a base electrode arranged to receive the serial pulse signals.

4. A transmitter as set forth in claim 2 wherein said signal processing means includes parallel-to-serial converter means for converting parallel output signals from said computer to the serial pulse signals.

5. A transmitter as set forth in claim 1 wherein said first and second device means each include a zener diode with said zener diodes being connected in series.

6. A transmitter as set forth in claim 1 wherein the physical variable is temperature and the two-wire transmission path includes a pressure transmitter means.

7. A transmitter as set forth in claim 6 wherein said pressure transmitter means includes a differential pressure transmitter.

8. A transmitter as set forth in claim 7 wherein said pressure transmitter means includes a static pressure transmitter.

* * * * *